(No Model.) 5 Sheets—Sheet 1.
O. ASSMANN.
SELF ACTING CORK STOPPING MACHINE.
No. 263,833. Patented Sept. 5, 1882.
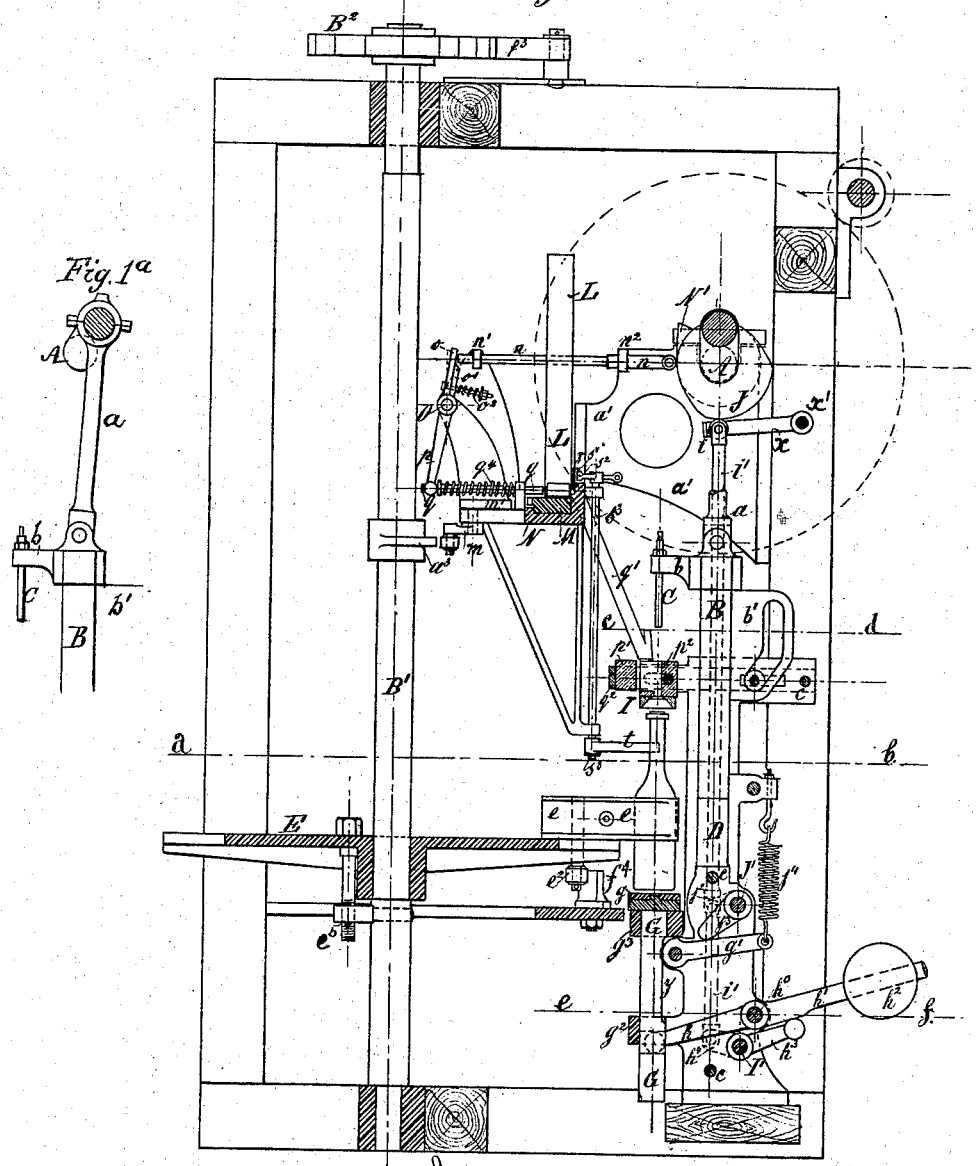
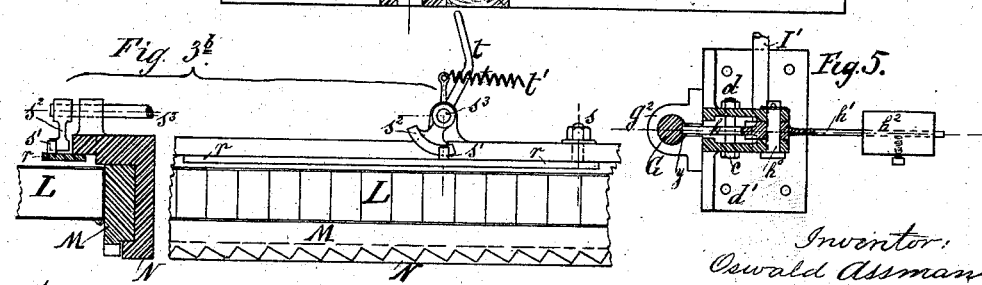
Witnesses:
David S. Williams
Harry Drury
Inventor:
Oswald Assmann
by his attorneys
Howson and Son (No Model.) 5 Sheets—Sheet 2.
O. ASSMANN.
SELF ACTING CORK STOPPING MACHINE.
No. 263,833. Patented Sept. 5, 1882.
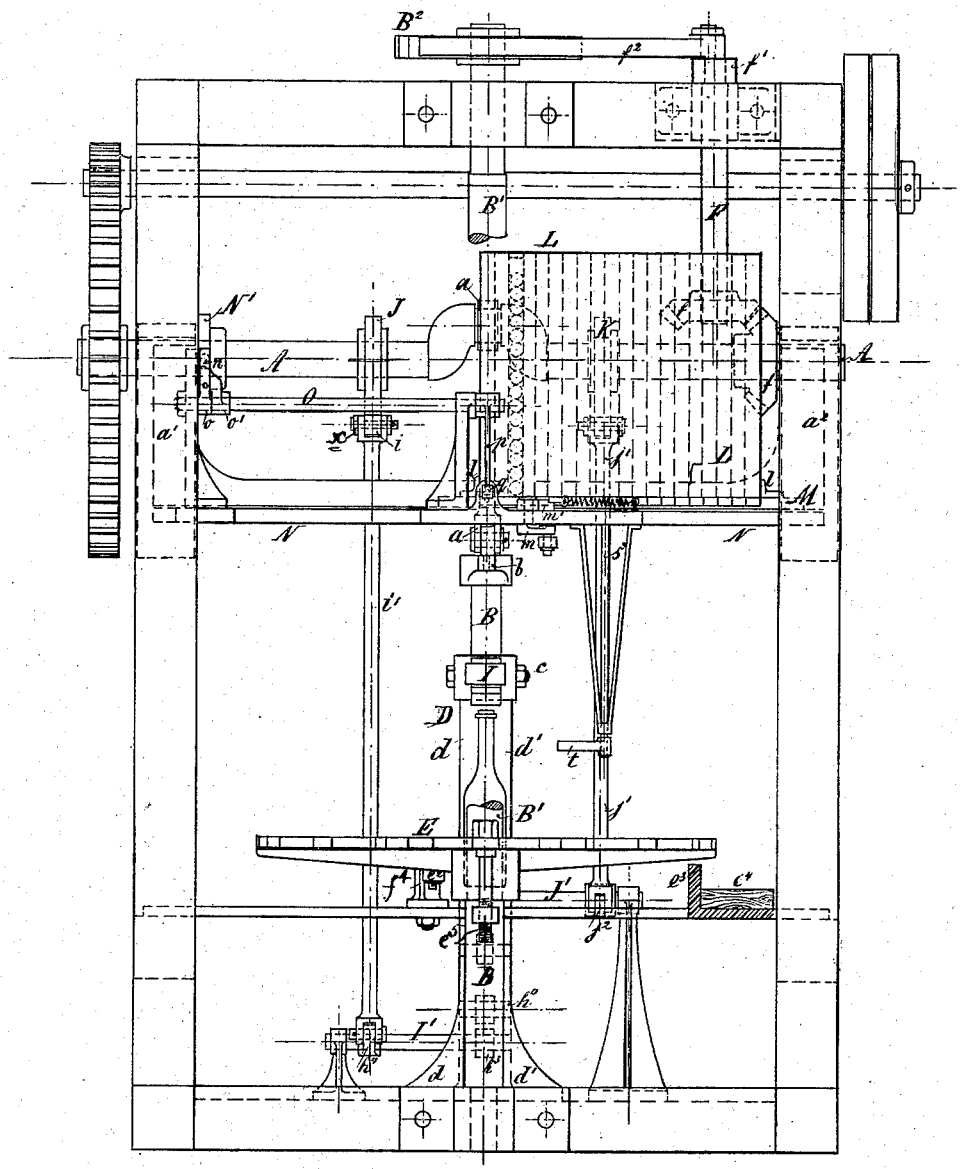

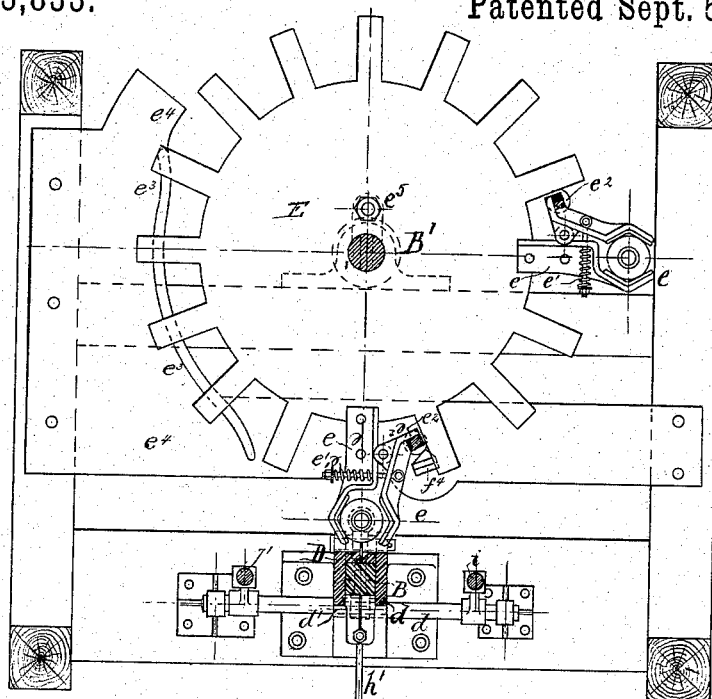

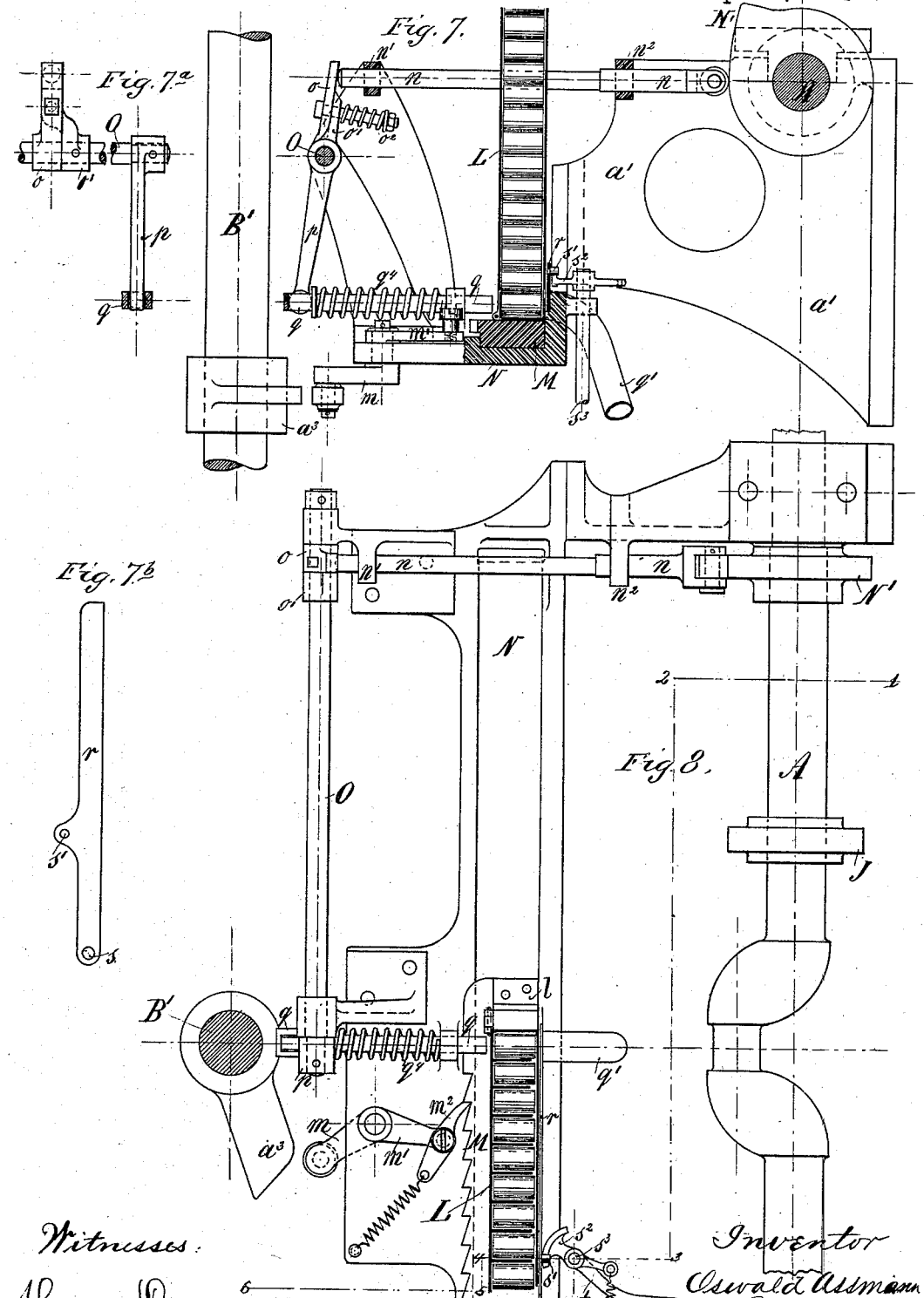

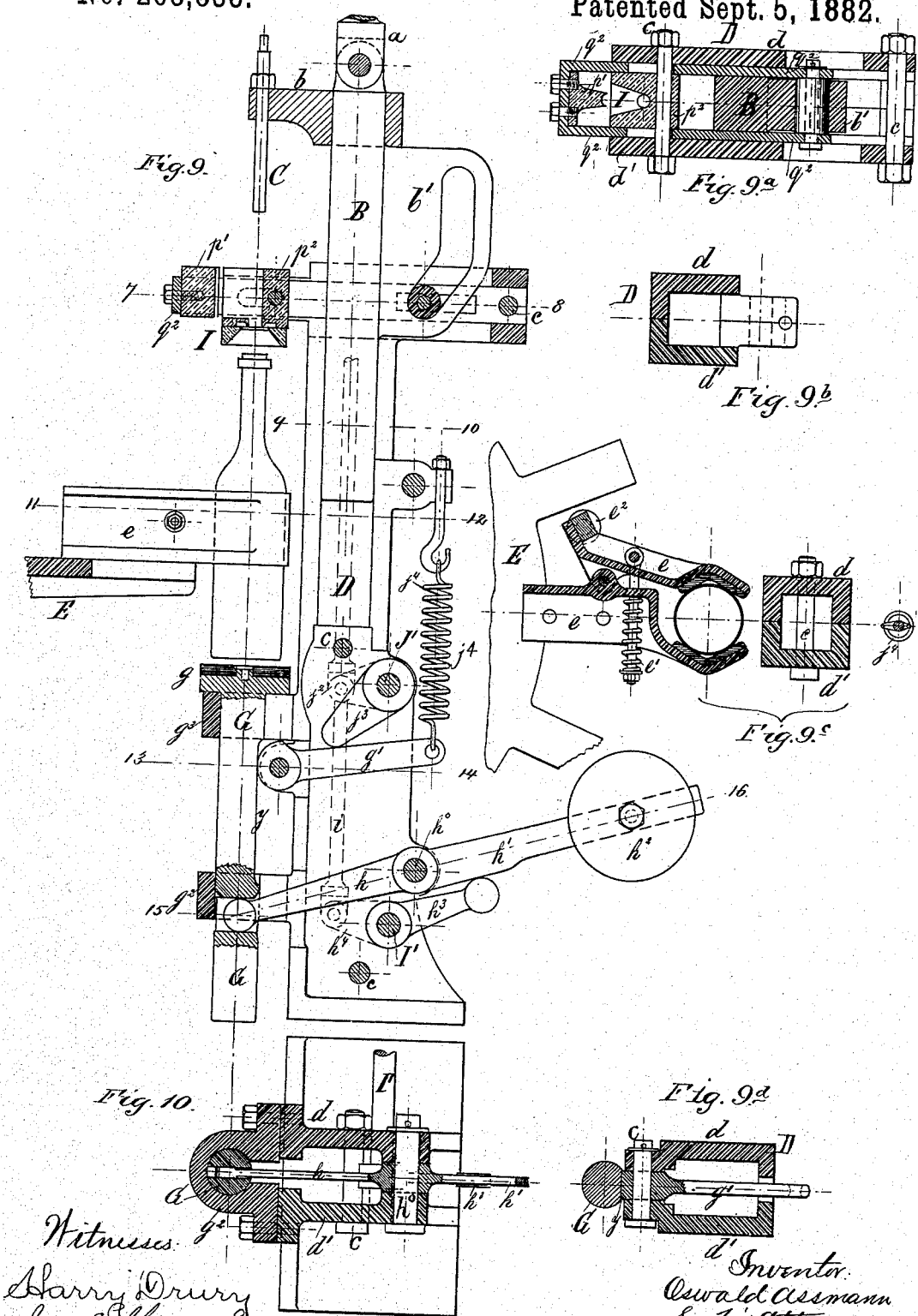

UNITED STATES PATENT OFFICE.

OSWALD ASSMANN, OF ZWOLLE, HOLLAND.

SELF-ACTING CORK-STOPPING MACHINE.

SPECIFICATION forming part of Letters Patent No. 263,833, dated September 5, 1882.

Application filed September 17, 1881. (No model.)

*To all whom it may concern:*

Be it known that I, OSWALD ASSMANN, a subject of the King of Holland, and residing in Zwolle, Holland, have invented certain Improvements in Self-Acting Cork-Stopping Machines, of which the following is a specification.

My invention relates to improvements in machines for corking bottles and similar receptacles; and the object of my invention is to so construct the apparatus as to automatically feed a succession of bottles to self-acting mechanism which inserts the corks into the bottle-necks, and then to withdraw the corked bottle from the corking mechanism, to insure the automatic feeding of the corks, and prevent the feeding of the corks when there is no bottle in position to be corked. This object I attain in the manner which I will now proceed to describe, reference being had to the accompanying drawings, in which—

Figure 1 represents a vertical section of my improved machine; and Fig. 1$^a$, a detached view, showing the crank, guide-bar, and connecting-rod; Fig. 2, a front elevation; Fig. 3, a plan view; and Fig. 3$^a$, a detached plan, illustrating the devices for automatically feeding the cork-receptacle; and Fig. 3$^b$, enlarged sectional and plan views of part of the cork-receptacle, its carrier-guide, and gate-operating device; Fig. 4, a sectional plan on the line $a\ b$, Fig. 1; and Fig. 4$^a$, a detached end view of the cork-receptacle; Fig. 5, a section on the line $e\ f$, Fig. 1; Fig. 6, a section on the line $c\ d$, Fig. 1; Fig. 7, a sectional view of the cork-expelling devices drawn to an enlarged scale on the line 1 2, Fig. 8; and Figs. 7$^a$ and 7$^b$, views of detached parts of the devices shown in Fig. 7; Fig. 8, a plan view of Fig. 7; Fig. 9, an enlarged sectional view of the corking devices; and Figs. 9$^a$, 9$^b$, 9$^c$, and 9$^d$, sections respectively on the lines 7 8, 9 10, 11 12, and 13 14, Fig. 9; and Fig. 10, a section on the line 15 16, Fig. 9.

The crank-shaft A of the machine may receive its motion from a main driving-shaft through the medium of suitable gearing, and it imparts a reciprocating motion to the vertical square guide-bar B through a connecting-rod, $a$. This bar is guided in the hollow standard D, which is composed of two parts, $d\ d'$, secured together by screw-bolts $c\ c$. The said bar is provided with a horizontal arm, $b$, carrying a piston, C, for forcing the corks into the bottles. The crank of the shaft A is of such a radius that about one-third only of a complete revolution of the said shaft is required for pressing a cork into the bottle. On the side of the bar B opposite the arm $b$ is a wing, $b'$, having an inclined or curved slot, in which works an anti-friction roller carried by the frame $q^2$ of the cork-receiving device I, so that the said frame is moved backward toward the bar B when the latter descends, Fig. 9.

Parallel with the bar B, and on the same side as the piston C, is a vertical shaft, B', carrying a horizontal disk, E, Fig. 1, which may be adjusted vertically on the shaft by means of a screw-bolt, $e^5$. This disk carries at its circumference a series of gripping-tongs, $e$, for holding and conveying the bottles, the machine shown in the drawings being intended to have sixteen such pairs of tongs equidistant from each other, but only two are represented in Fig. 4. The jaws of the tongs are preferably of the angular shape shown, and are lined with rubber or similar material. The number of these tongs may be varied as may be found convenient. One arm of each pair of tongs is fixed to the rotating disk E and the other pivoted thereto, the latter being normally held up to the fixed jaw or closed by a spiral spring, $e'$, Fig. 9$^c$. The inner end of the pivoted arm of each pair of tongs extends beneath the disk and carries an anti-friction roller, $e^2$, which as the disk revolves is adapted to come into contact with the curved rail $e^3$, Figs. 2 and 4, secured to some fixed part of the frame, and so cause the jaws of the tongs to open. The rail $e^3$ is sufficiently long to allow the rollers of three or four pairs of tongs to pass on it at the same time, so that the corked bottles may be removed from and others to be corked be introduced into the machine at this point, where a supporting-bench, $e^4$, is provided for the purpose.

At the upper end of the vertical shaft B' is a ratchet-wheel, B$^2$, which has as many teeth as there are tongs on the disk E. This ratchet is acted on by a pawl, $f^2$, carried by the crank $f'$ of the short vertical shaft F, Figs. 2 and 3, which receives motion from the crank-shaft A through the bevel-wheels $f\ f$. At each revolution of the shaft A, and consequently for each operation of the bar B and corking-piston, the shaft B' is rotated the extent of one tooth of the ratchet, and therefore the disk E is rotated the extent of the distance between the center of one pair of tongs and the next, so that the tongs $e$, with their respective bottles, are successively brought exactly below the piston C of the machine. A counter-pawl, $f^3$, retains the ratchet $B^2$ and shaft in the position to which it may be moved, the two pawls being preferably connected by a spring, $x$, to insure their gearing with the ratchet-wheel. The length of stroke of the crank $f'$ is greater than the length of each tooth of the ratchet, so that the ratchet-wheel is acted on only during about a third of a revolution of the crank $f'$.

In the same vertical line as the piston C, but below the same, is a plunger, G, Figs. 9 and 10, guided in bearings $g^2$ $g^3$ in some fixed part of the frame, and to a slot in this plunger is adapted the end of the lever $h$, pivoted at $h^0$ to the frame, and carrying a weight, $h^2$, on its arm $h'$. The weighted end of this lever is normally supported by an arm, $h^3$, on the shaft I', which is controlled by the cam J on the crank-shaft A, acting on the roller $i$ of the vertical rod $i'$, which is connected to an arm, $h^4$, on the shaft I'. The plunger G has a flattened face, $y$, Fig. $9^d$, against which bears the cam-shaped end of the lever $g'$, pivoted to the frame and acted on by a spiral spring, $j^4$, which tends to pull the end of the lever upward and force the cam to grip the plunger. The lever $g'$ is acted on against the tension of the spring by an arm, $j^3$, on a horizontal shaft, J', operated by the cam K through the medium of the rod $j'$, connected to the arm $j^2$ on the said shaft J'. The rods $i'$ and $j'$ are guided at the upper ends by being pivoted to arms $x$, hung to the transverse rod $x'$ on the frame, Figs. 1, 2, and 3.

The corks are contained in a flat vertical case, L, which is divided by vertical partitions into compartments of equal size and a little wider than the largest size of cork to be used. This case is fitted between projections $l$ $l$ on the carrier M, so as to be removable therefrom, the carrier M sliding in a groove in the cross-bar N, which is suspended from the brackets $a'$ $a^2$, carrying the bearings of the crank-shaft. The sliding carrier M is on one side provided with a rack, the teeth of which are each equal to the width of a compartment in the casing L. As shown in Figs. 3, $3^a$, 7, and 8, a spring-pawl, $m^2$, engages with this rack, this pawl being carried by a double lever, $m$ $m'$, pivoted to the frame and acted on by a cam, $a^3$, on the vertical shaft B', Figs. 1, 7, and 8, so as to move the casing L forward the extent of one tooth or compartment at a time. This occurs at each complete revolution of the shaft B', and each compartment contains as many corks as there are pairs of tongs on the disk E, and a weight, hollowed out on its under side to fit the cork, is laid on the top of each column to give the requisite downward pressure to the corks. In order to facilitate the proper expulsion of each cork, the side plates of the casing do not reach quite down to the bottom.

On the crank-shaft A is a cam, N', which acts on a horizontal rod, $n$, Figs. 1 and 3, which slides in bosses $n'$ $n^2$ on the bracket $a'$, and bears with its end against the lever $o$ on the shaft Q. This shaft also carries a lever, $p$, operating the cork-expeller $q$, which is normally held back by a spiral spring, $q^4$. The lever $o$ consists of two parts, one part, $o'$, secured to the shaft O, and the other mounted loosely thereon, the two parts, however, being held together by a spring, $o^2$, the tension of which is adjusted so as to keep the two parts of the lever together under the ordinary expulsion of a cork; but should it happen that a cork did not lie in a horizontal but in a vertical position in front of the expeller $q$, and that therefore it could not well be driven out, or that the expulsion of a cork be rendered impossible for any other reason, the loose arm of the lever $o$ will oscillate on the shaft O, compressing the spring $o^2$. By this arrangement breakage of any part of the mechanism is prevented.

Immediately opposite the cork-expeller $q$ is the inclined channel $q'$, terminating over the cork-receiving device I, which consists of a fixed cheek, $p^2$, and movable cheek $p'$, the latter being carried by the frame $q^2$ $q^2$, Figs. 9 and $9^a$, sliding in guides of the standard D. This frame is intermittently moved toward and from the fixed cheek by the movement of the bar B, whose slotted wing $b'$ acts on an anti-friction roller on said movable jaw.

At the back of the casing L, immediately in front of the opening through which the corks are expelled into the channel $q'$, is a small gate, $r$, Figs. 1, 3, and $3^b$, having its fulcrum at $s$, and normally remaining by gravity in a position to close the opening. On this gate $r$ is a pin, $s'$, Figs. 7 and 8, resting on the inclined face of the sector $s^2$, carried by the vertical spindle $s^3$. The lower end of the spindle carries an arm, $t$, which lies in the path of the bottles, so that when the disk carries the bottles around the neck of the bottle strikes the arm $t$ and turns the spindle and sector, so as to raise the gate $r$ to permit the cork to be expelled into the channel $q'$. When the bottle has passed a suitable spring, $t'$, Figs. 3 and $3^b$, draws back the spindle, arm, and sector to their normal positions. Should a pair of tongs happen to come around into position without a bottle, the gate $r$ will remain closed, and the expeller $q$ cannot therefore force out the cork; but the lever $o$ will in that case yield, as before described.

The operation of the machine is as follows: Suppose the operation of the crank-shaft A to have so intermittently rotated the shaft B' as to bring a pair of jaws, $e$, beneath the piston C with a bottle which has been applied to the jaws at the bench $e^4$. As the roller $e^2$ on the end of the movable jaw strikes the inclined tappet $f^4$ on the frame the jaws open and allow the bottle to fall onto the head $g$ of the plunger G, and as the disk E comes to a stop the fixed jaw of the tongs pushes the bottle onto the middle of the plunger-head. The cam J has come to such a position as to allow the shaft I' to turn and permit the weighted end of the lever $h$ to fall, and so raise the plunger G and bring the neck of the bottle into contact with the tapering opening in the cork-receiver I. At the same time the cam K has released the lever $g'$ from the pressure of the arm $j^3$, and the spring $j^4$, acting on the lever $g'$, forces its cam-shaped end against the flat face of the plunger G and keeps the latter in its raised position. The cam N' then so acts on the rod $n$ and lever $o$ as to cause the expeller $q$ to force a cork out of the lower end of the compartment into the channel $q'$, the gate $r$ having been raised by the wedge-shaped sector $s^2$, whose spindle $s^3$ has meanwhile been turned by the bottle coming into contact with the arm $t$, Fig. 1. The bar B then descends, and as it does so brings the movable jaw of the cork-receiver I toward the fixed cheek $p^2$, so as to bring the cork into exact position for the piston C, which, as the bar continues to descend, forces the cork into the neck of the bottle. The bar B then ascends, the cheek $p'$ moves back, the cam K causes the arm $j^3$ to press down the lever $g'$ and release the plunger G. At the same time the cam J causes the arm $h^3$ to raise the weighted end of the lever $h$ and lower the plunger and its corked bottle. A rotary motion is then imparted to the shaft B' and disk E by the pawl $f^2$ and ratchet B² to the extent of one tooth of the ratchet, so as to bring another bottle into position to be corked, the roller $e^2$ on the pair of tongs previously in position being released from the tappet $f^4$ as the table begins to move, so as to allow the jaws to spring together and clasp the corked bottle. The operations above described are then repeated with the next bottle, and so on.

The casing L for the corks preferably has one of its sides hinged, as indicated in Fig. 4ª, or as in Figs. 7 and 8, so that it may be opened, in order to more readily fill the compartments. When all the compartments of a casing have been successively emptied the casing is withdrawn from the carrier M and another filled one put in its place.

I claim as my invention—

1. The combination of the corking-piston of a corking-machine with a rotary disk, E, having a number of gripping-tongs for the bottles, and devices, substantially as described, for automatically opening and closing the tongs as the disk is intermittently rotated.

2. The combination of corking mechanism and a rotary disk, E, with a series of gripping-tongs, $e$, carried thereby, and each having a fixed and a movable arm and a rail, $e^3$, and tappet $f^4$, for acting on said arm, substantially as set forth.

3. The combination of the corking-piston and movable plunger G in line therewith and mechanism for raising and lowering said plunger with a rotary disk carrying a series of gripping tongs and devices, substantially as set forth, for opening and closing the jaws of said tongs.

4. The combination of the piston and plunger G with weighted lever $h$, cam, and intermediate devices for raising the said lever, a cam-lever, $g'$, spring, and mechanism for operating the cam-lever against the action of the spring, substantially as specified.

5. The combination of the piston, standard, and plunger G with devices, substantially as described, for automatically raising and lowering the said plunger, lever $g'$, for bearing on the smooth face of the plunger, oscillating shaft, and arm $j^3$.

6. The combination of the standard and a bar, B, carrying a piston, and slotted wing $b'$, with a cork-receiver having jaws, one of which is movable and controlled by said slotted wing, substantially as set forth.

7. The combination of a casing, L, for containing corks, with an expeller, $q$, arm $p$, shaft O, lever $o$, rod $n$, and cam N'.

8. The combination of a disk, a casing, L, for containing corks, gate $r$, for closing its discharge-opening, and an expeller, $q$, with an inclined sector for acting on said gate, shaft $s^3$, and arm $t$ in the line of movement of the bottles to be corked, as and for the purpose set forth.

9. The casing L, divided into a series of compartments, having one of its sides hinged, and leaving a space between the lower end of each side and the bottom of the casing for the discharge of the corks from each compartment.

10. The combination of the cork expeller and receiver with the frame-carrier M and casing L, divided into a series of compartments, and mechanism, substantially as set forth, for intermittently moving the carrier forward the extent of one compartment, as set forth.

In testimony whereof I have signed my name to this specification in the presence of two subscribing witnesses.

OSWALD ASSMANN.

Witnesses:
RICHARD BARTSCH,
GEORG ASSMANN.